US006575144B2

(12) United States Patent
Hellar et al.

(10) Patent No.: US 6,575,144 B2
(45) Date of Patent: Jun. 10, 2003

(54) METHOD FOR CONTROLLING AN ENGINE UTILIZING VEHICLE POSITION

(75) Inventors: Greg Hellar, Trenton, MI (US); John Buckert, Sterling Heights, MI (US); James Garrett, Inkster, MI (US); Kay Margaret Reitz, Dearborn, MI (US); Lynn Edward Davison, Saline, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/918,784

(22) Filed: Jul. 31, 2001

(65) Prior Publication Data

US 2003/0024508 A1 Feb. 6, 2003

(51) Int. Cl.[7] .......................... G06F 19/00; B60T 7/18; F02M 51/00

(52) U.S. Cl. ....................... 123/491; 123/478; 123/465; 123/494; 701/115; 701/207

(58) Field of Search ................................ 123/380, 491, 123/465, 478, 494, 488; 701/207, 213, 115, 117, 118, 209, 103, 104

(56) References Cited

U.S. PATENT DOCUMENTS

| | | | | | |
|---|---|---|---|---|---|
| 4,572,142 | A | * | 2/1986 | Arnold et al. .............. | 123/478 |
| 5,494,018 | A | * | 2/1996 | Black et al. ................ | 123/478 |
| 5,720,258 | A | * | 2/1998 | Tolkacz et al. ............. | 123/352 |
| 5,815,824 | A | | 9/1998 | Saga et al. | |
| 5,848,582 | A | * | 12/1998 | Ehlers et al. ............... | 123/486 |
| 5,983,156 | A | | 11/1999 | Andrews | |
| 6,016,795 | A | | 1/2000 | Ohki | |
| 6,062,202 | A | * | 5/2000 | Chasteen .................... | 123/478 |
| 6,134,499 | A | | 10/2000 | Goode et al. | |
| 6,151,549 | A | * | 11/2000 | Andrews et al. ............ | 180/167 |
| 6,158,416 | A | * | 12/2000 | Chen et al. ................. | 123/380 |
| 6,260,539 | B1 | * | 7/2001 | Minowa et al. ............. | 123/478 |
| 6,286,480 | B1 | * | 9/2001 | Chen et al. ................. | 123/380 |
| 6,390,055 | B1 | | 5/2002 | Sivashankar et al. ....... | 123/295 |
| 6,512,974 | B2 | * | 1/2003 | Houston et al. ............ | 701/115 |
| 6,539,299 | | * | 3/2003 | Chatfield et al. ........... | 701/104 |

* cited by examiner

*Primary Examiner*—Willis R. Wolfe
*Assistant Examiner*—Hai Huynh
(74) *Attorney, Agent, or Firm*—John F. Buckert; Allan J. Lippa

(57) ABSTRACT

A method is provided for controlling an internal combustion engine in a vehicle. The method includes adjusting a fuel injection amount during engine crank based on a barometric pressure. The barometric pressure is determined from at least one signal received from at least one transmitter external from the vehicle.

22 Claims, 8 Drawing Sheets

Figure - 3A
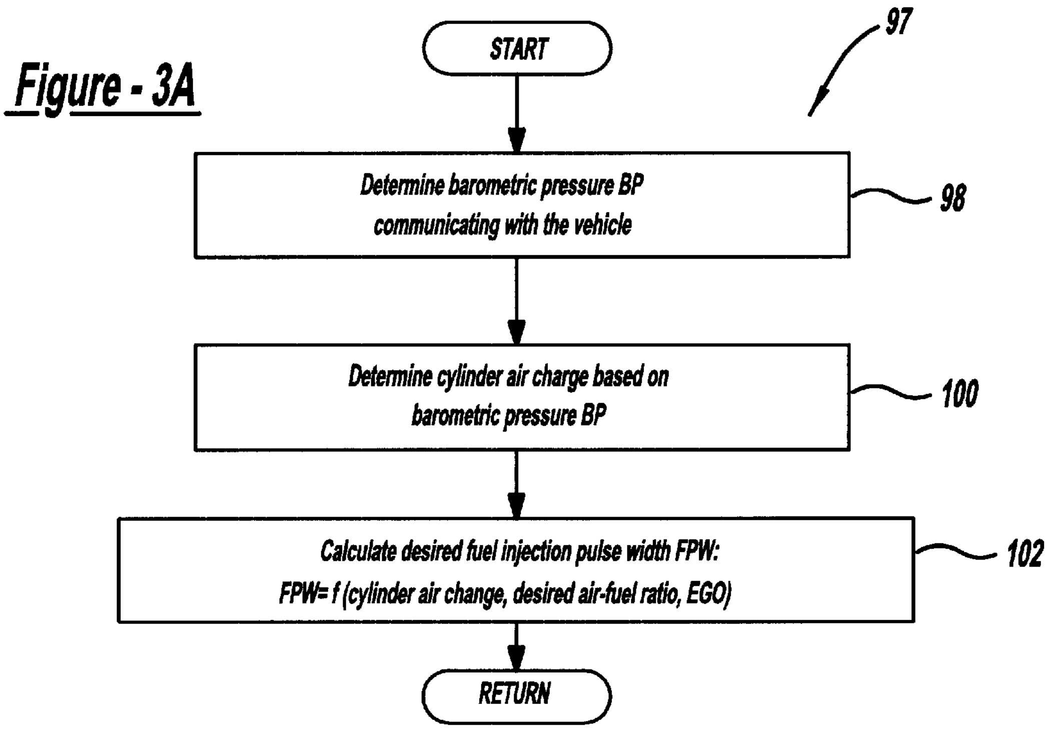
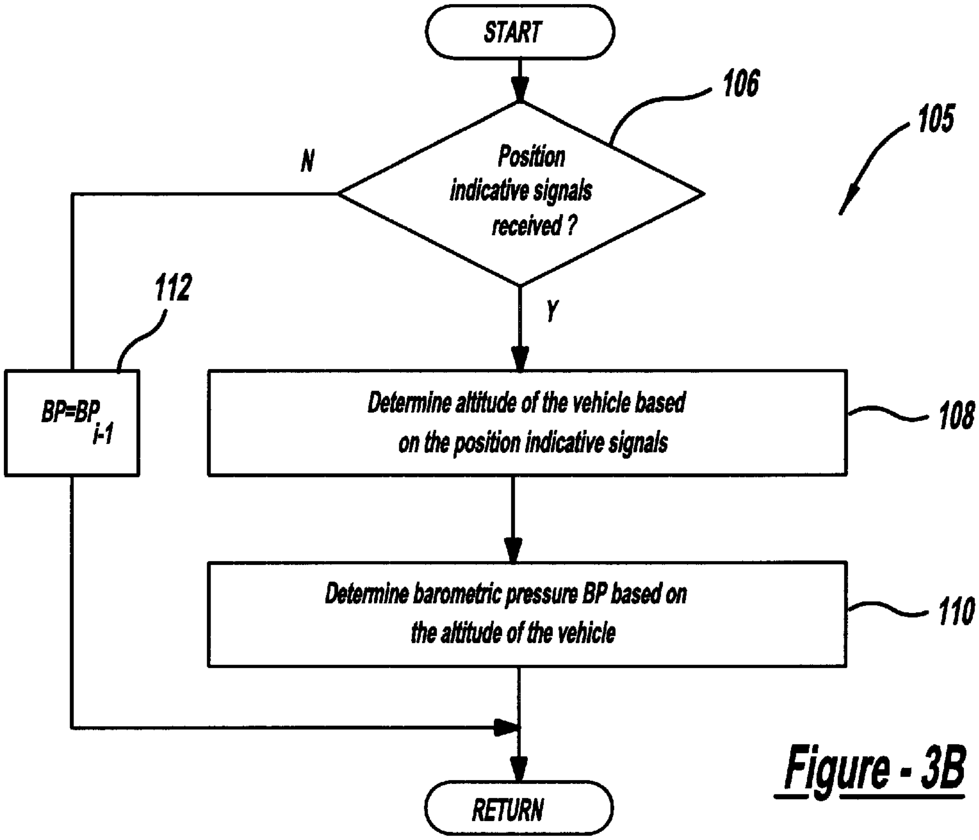
Figure - 3B

112
| ALTITUDE (FEET)Above Sea Level | BAROMETRIC PRESSURE BP (PSI) |
|---|---|
| 0 | 14.6953125 |
| 2000 | 13.6640525 |
| 4000 | 12.6914063 |
| 6000 | 11.7753906 |
| 8000 | 10.9140825 |
| 10000 | 10.1044922 |
| 12000 | 9.34472656 |
| 14000 | 8.83183594 |
| 16000 | 7.96289063 |
| 18000 | 7.33691406 |
| 20000 | 6.76195313 |
Figure - 4
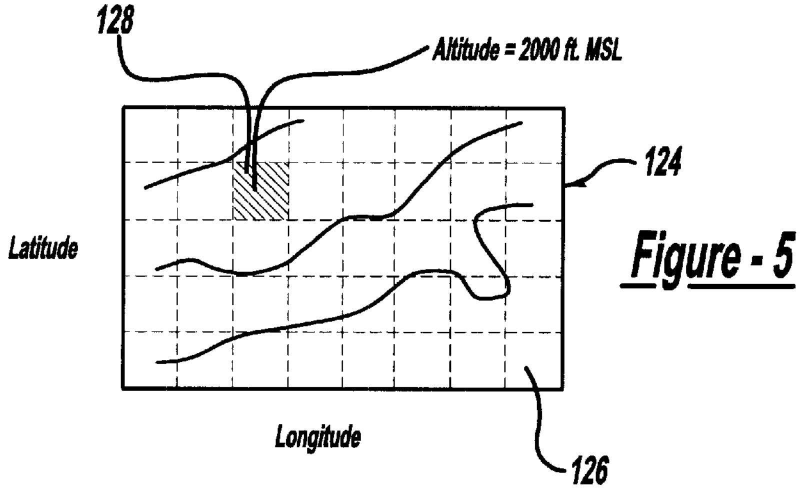
Figure - 5
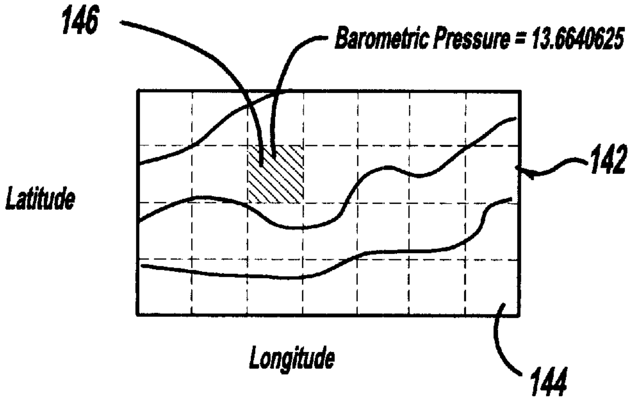
Figure - 6

METHOD FOR CONTROLLING AN ENGINE UTILIZING VEHICLE POSITION

FIELD OF THE INVENTION

The invention relates to a control system and method for controlling a fueling amount of an engine during engine crank. More particularly, the invention relates to a control system and method that delivers a fuel injection amount during engine crank based on a barometric pressure determined from signals received from a global positioning system.

BACKGROUND OF THE INVENTION

Known engines have long utilized open loop air-fuel control during engine crank when the engine is being started. In particular, an engine controller generally utilizes either a measured or estimated cylinder air charge (lbs. of air/cylinder) and a desired air-fuel ratio to determine a fuel injection amount (lbs. of fuel/cylinder) during engine crank.

Known engine control systems have also utilized mass air flow (MAF) sensors in the throttle body of an engine to determine the cylinder air charge. However, during engine crank, MAF sensors may not provide accurate measurements of mass air flow because the airflow rate is at a lower measurable range of the sensor. Thus, to determine the cylinder air charge during engine crank, known systems have utilized the engine speed, an intake throttle position, and a stored estimated barometric pressure to calculate the cylinder air charge, instead of utilizing the MAF sensor output signal.

The stored estimated barometric pressure value, however, is only updated when the engine is operated at high engine speeds and/or large intake throttle openings when an accurate estimated barometric pressure can be determined. When the vehicle is driven from a low altitude to a relatively high altitude with respect to sea level, the stored barometric pressure may not be updated if high engine speeds and/or large throttle openings are not obtained. Thus, when the engine is stopped and thereafter enters engine crank, the stored barometric pressure may have a large error with respect to the actual barometric pressure. Thus, because the cylinder air charge is determined based on the inaccurate stored barometric pressure, the cylinder air charge may have a large error with respect to the actual inducted cylinder air charge. In this case, the estimated cylinder air charge would be greater than the actual cylinder air charge. Thus, a greater amount of fuel than needed for stoichiometric combustion (i.e., a rich air-fuel mixture) would be injected into the engine cylinder, which may result in a "long start" condition or a "no start" condition of the engine. Further, the rich air-fuel mixture may result in increased hydrocarbon (HC) emissions from the engine and decreased fuel economy.

In order to obtain more accurate estimates of cylinder air charge during engine crank mode, other known systems have added a pressure sensor to measure the barometric pressure. However, adding the pressure sensor increases assembly time, component costs, and warranty costs.

SUMMARY OF THE INVENTION

The invention relates to a control system and method that delivers a predetermined fuel injection amount, based on a barometric pressure determined from signals received from an external source. The external source may comprise a global positioning system, a communication satellite, or a land-based communication station that transmits either position indicative signals or other signals indicative of the barometric pressure. The inventive method is preferably utilized during engine crank. However, the inventive method may also be utilized during closed loop air-fuel control of the engine after engine crank has been completed.

The method for controlling an internal combustion engine in a vehicle in accordance with first aspect of the present invention includes adjusting a fuel injection amount during engine crank based on an ambient barometric pressure, the barometric pressure determined from at least one signal received from at least one transmitter external from the vehicle. The signals may comprise signals that are indicative of an altitude of the vehicle. The altitude can be utilized to determine the barometric pressure based on a known relationship between altitude and barometric pressure. Alternately, the signals may be indicative of latitudinal and longitudinal position of the vehicle. The latitudinal position and longitudinal position may be correlated with stored elevational information to determine the altitude of the vehicle, and, the altitude may be used to calculate the barometric pressure as described above. Alternately, the latitudinal and longitudinal position may be correlated with stored barometric pressure information to determine the associated barometric pressure.

The control system for an internal combustion engine in accordance with a second aspect of the present invention includes a receiver receiving at least one signal from at least one transmitter external from the vehicle, the signal being indicative of barometric pressure. The control system further includes a controller operably connected to the receiver, the controller adjusting a fuel injection amount in the engine during engine crank responsive to the barometric pressure.

The control system and method for controlling an internal combustion engine in accordance with the present invention provides a substantial advantage over conventional systems and methods. When a receiver, such as a GPS receiver, is already installed in a vehicle, the method may accurately determine the barometric pressure based on at least one signal received from a global positioning system. Thus, an additional pressure sensor that would ordinarily be utilized to determine barometric pressure can be omitted from the vehicle. Further, once the barometric pressure is determined, the barometric pressure can be utilized to control a fuel injection amount during various engine operating conditions including engine crank. Because GPS signals allow for accurate barometric pressure readings to be calculated, the cylinder air charge and the fuel injection amount, determined based on the barometric pressure, can also be accurately determined. Thus, the inventive control system and method solves the potential problems of "no start" or "long start" conditions during engine crank at high altitudes due to an inadvertent rich air-fuel mixture being injected into the engine cylinders because of an inaccurate barometric pressure estimate.

BRIEF DESCRIPTION OF THE DRAWINGS

FIGS. 3A–3E are flowcharts of a method of controlling an internal combustion engine in accordance with the present invention.

FIG. 4 is a table of altitude and barometric pressure values that may be utilized by the inventive method.

FIG. 5 is a graph illustrating a table of latitudinal, longitudinal and altitude values that may be utilized by the inventive method.

FIG. 6 is a graph illustrating a table of latitudinal, longitudinal and barometric pressure values that may be utilized by the inventive method.

DESCRIPTION OF EMBODIMENTS

Figure 1:
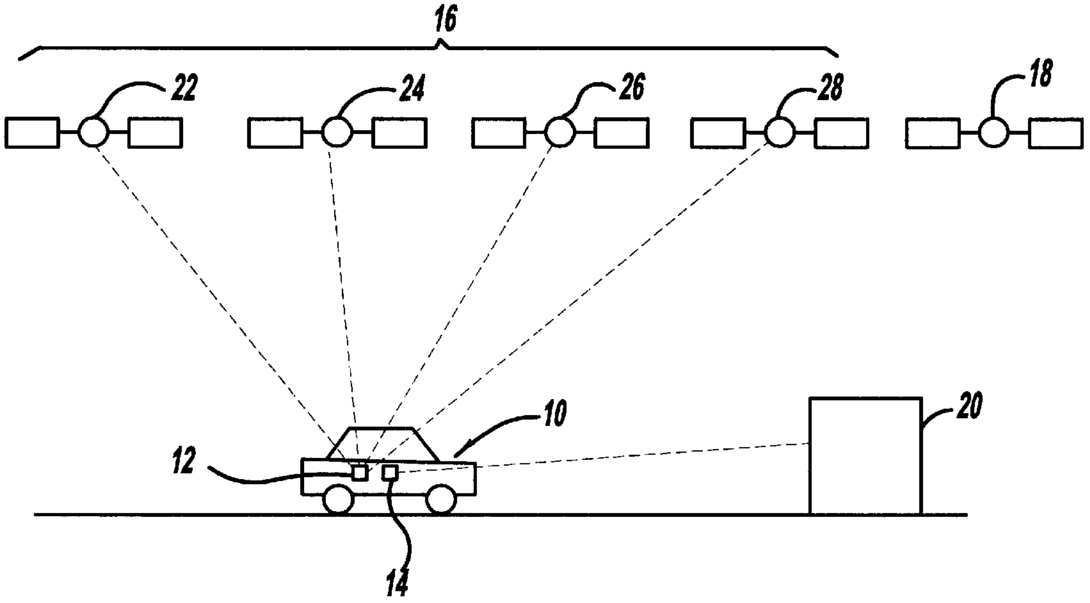
FIG. 1 is a schematic of an automotive vehicle having a receiver for receiving signals from a global positioning system and/or a land-based communication station in accordance with the present invention.

Referring now to the drawings, like reference numerals are used to identify identical components in the various views. Referring to FIG. 1, an automotive vehicle 10 is shown having a receiver 12 and an optional transceiver 14. The receiver 12 can be any conventional receiver capable of receiving electromagnetic signals from a suitable transmission system wherein geographic position and/or altitude can be determined. In a preferred embodiment, the receiver 12 receives radio frequency signals, indicative of position and/or altitude of vehicle 10, from a global positioning system 16. The operation of an optional transceiver 14, the communication satellite 18, and the land based communication station 20 will be described in greater detail below.

The global positioning system 16 may comprise a plurality of GPS satellites 22, 24, 26, 28 orbiting earth. Currently, there are 24 such satellites positioned above North America. The satellites 22, 24, 26, 28 continuously transmit radio frequency signals that are utilized to determine a geographic position on Earth. Generally, signals from at least three satellites may be utilized to determine longitudinal and latitudinal position of a receiver. Further, signals from at least four satellites may be utilized to determine an altitude of the receiver.

In Europe, a similar satellite based system, GLONAS, also operates in a similar manner as compared with the GPS system utilized in North America. Thus, in an alternate embodiment, the receiver 12 could be a GLONAS receiver that can determine position and altitude based upon signals received from the GLONAS satellites.

Figure 2:
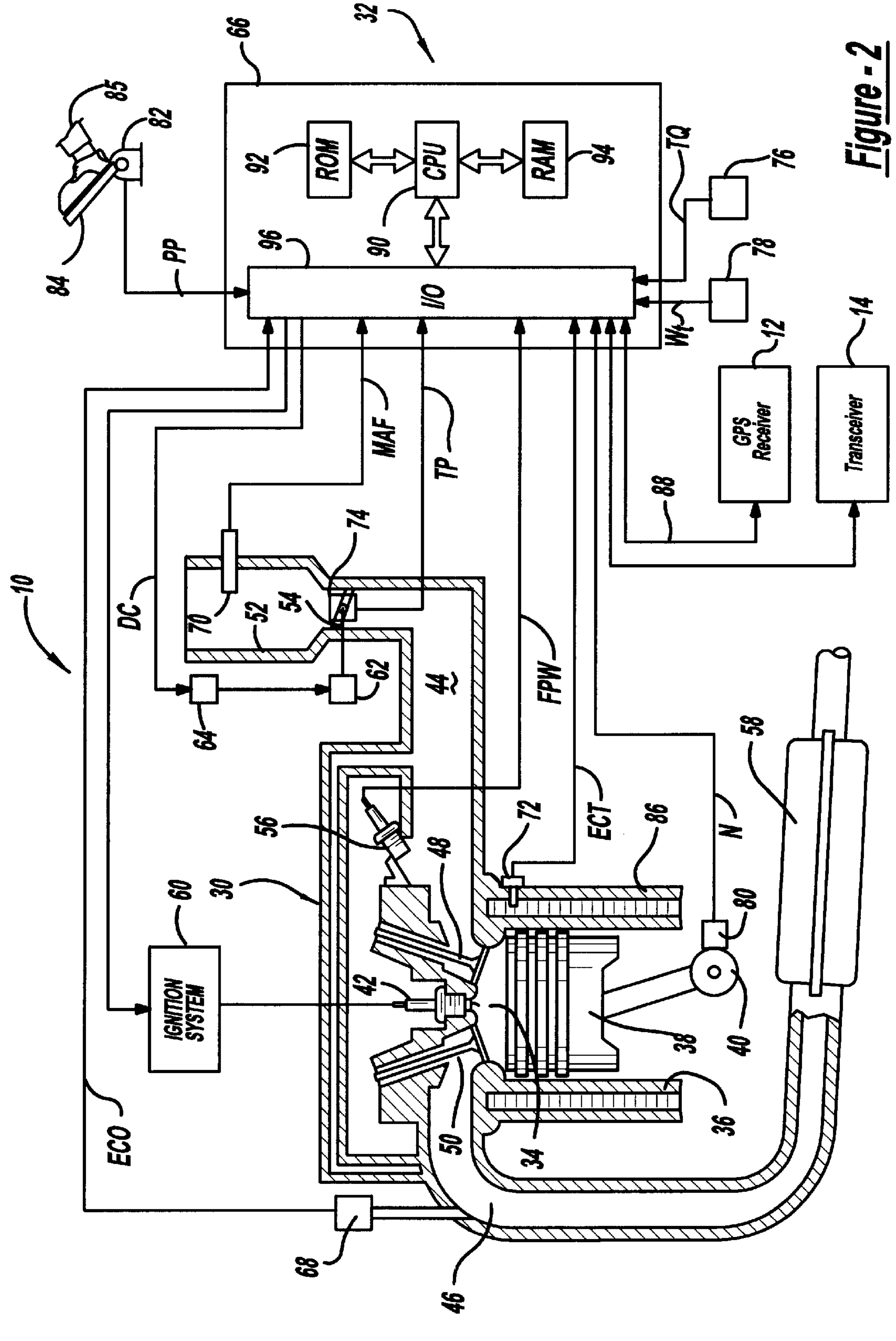
FIG. 2 is a schematic of an engine control system in accordance with the present invention in conduction with a conventional engine.

Referring to FIG. 2, the vehicle 10 is shown which includes an internal combustion engine 30 and an engine control system 32.

The engine 30 comprises a plurality of cylinders, one cylinder of which is shown in FIG. 2. Engine 30 further includes a combustion chamber 34, cylinder walls 36, a piston 38, a crankshaft 40, a spark plug 42, an intake manifold 44, an exhaust manifold 46, an intake valve 48, an exhaust valve 50, a throttle body 52, a throttle plate 54, a fuel injector 56, and a catalytic converter 58.

Combustion chamber 34 communicates with intake manifold 44 and exhaust manifold 46 via respective intake and exhaust valves 48, 50. Piston 38 is positioned within combustion chamber 34 between cylinder walls 36 and is connected to crankshaft 40. Ignition of an air-fuel mixture within combustion chamber 34 is controlled via spark plug 42 which delivers ignition spark responsive to a signal from distributorless ignition system 60.

Intake manifold 44 communicates with throttle body 52 via throttle plate 54. Throttle plate 54 is controlled by electric motor 62 which receives a signal from ETC driver 64. ETC driver 64 receives a control signal (DC) from a controller 66. Intake manifold 44 is also shown having fuel injector 56 coupled thereto for delivering fuel in proportion to the pulse width of signals (FPW) from controller 66. Fuel is delivered to fuel injector 56 by a conventional fuel system (not shown) including a fuel tank, fuel pump, and fuel rail (now shown). Although a port fuel injection is shown, a direct fuel injection could be utilized instead of port fuel injection.

Exhaust manifold 46 communicates with catalytic converter 58 which reduces exhaust gases such a hydrocarbons (HC), nitrous oxides (NOx), and carbon monoxide (NO).

Control system 32 is provided to control the operation of the engine 30 in accordance with the present invention. Control system 32 includes distributorless ignition system 60, an electric motor 62 for controlling the throttle plate 54, an ETC driver 64, an exhaust gas sensor 68, a mass air flow sensor 70, a temperature sensor 72, a throttle position sensor 74, a torque sensor 76, a turbine speed sensor 78, a variable reluctance sensor 80, a pedal position sensor 82, an accelerator pedal 84, GPS receiver 12, an optional transceiver 14, and controller 66.

In an alternate embodiment, throttle plate 54 may be directly connected to accelerator pedal 84 by a mechanical linkage or cable.

The distributorless ignition system 60, electric motor 62, and ETC driver were discussed above and will not be described in any further detail.

Exhaust gas sensor 68 is conventional in the art and may comprise either an EGO, HEGO, or UEGO oxygen sensor. As illustrated, the sensor 68 is coupled to exhaust manifold 46 upstream of catalytic converter 58. The sensor 68 may generate a signal EGO responsive to an oxygen concentration in the exhaust gases which is received by the controller 66.

Mass air flow sensor 70 generates a signal indicating the inducted mass air flow (MAF) which is received by the controller 66. The sensor 70 is conventional in the art and may be coupled to the throttle body 52 or intake manifold 44.

Temperature sensor 72 generates a signal indicating the engine coolant temperature (ECT) which is received by the controller 66. The sensor 72 is conventional in the art and is coupled to the cooling jacket 86 in the cylinder wall 36.

Throttle position sensor 74 generates a signal indicating a throttle position (TP) of the throttle plate 54 which is received by the controller 66. Accordingly, sensor 74 provides positional information of the plate 54 for closed-loop control of the plate 54.

Torque sensor 76 generates a signal indicating the transmission shaft torque or the engine shaft torque (TQ) which is received by the controller 66.

Turbine speed sensor 78 generates a signal (Wt) indicating the speed of a shaft connected to a turbine (not shown) which is received by the controller 66.

Variable reluctance sensor 80 generates a variable reluctance signal (VRS) indicating an engine speed (N). In a alternate embodiment, sensor 80 may comprise a hall effect sensor that generates a profile ignition pickup signal (PIP) indicating an engine speed (N). As illustrated the sensor 80 may be coupled to the crankshaft 40 and transmits the signal N to the controller 66.

Accelerator pedal 84 is shown communicating with the driver's foot 85. Pedal position sensor 82 generates a signal indicating acceleration pedal position (PP) that is transmitted to the controller 66.

The GPS receiver 12 is provided to receive signals from GPS satellites 22, 24, 26, 28 and to generate a parameter that is indicative of barometric pressure (BP). The receiver 12 may be connected to the controller 66 via a bi-directional bus 88. The bus 88 allows the controller 66 to query the receiver 12 for specific information such as vehicle position and/or vehicle altitude based upon the received signals. The receiver 12 is conventional in the art and may comprise any one of a plurality of commercially available GPS receivers. For example, the receiver 12 may comprise an M12 Oncore System manufactured by Motorola, Inc. As discussed below, the vehicle position or altitude can be utilized to determine barometric pressure (BP).

The controller 66 is provided to implement a method in accordance with the present invention. The controller includes a microprocessor 90 communicating with various computer-readable storage media. The computer readable storage media preferably include volatile and nonvolatile storage in a read-only memory (ROM) 92 and a random-access memory (RAM) 94. The computer readable media may be implemented using any of a number of known memory devices such as PROMs, EPROMs, EEPROMs, flash memory or any other electric, magnetic, optical or combination memory device capable of storing data, some of which represent executable instructions, used by the microprocessor 90 in controlling the engine. The microprocessor communicates with various sensors and actuators (discussed above) via an input/output (I/O) interface 96. Of course, the present invention could utilize more than one physical controller to provide engine/vehicle control depending upon the particular application.

Figure 3C:
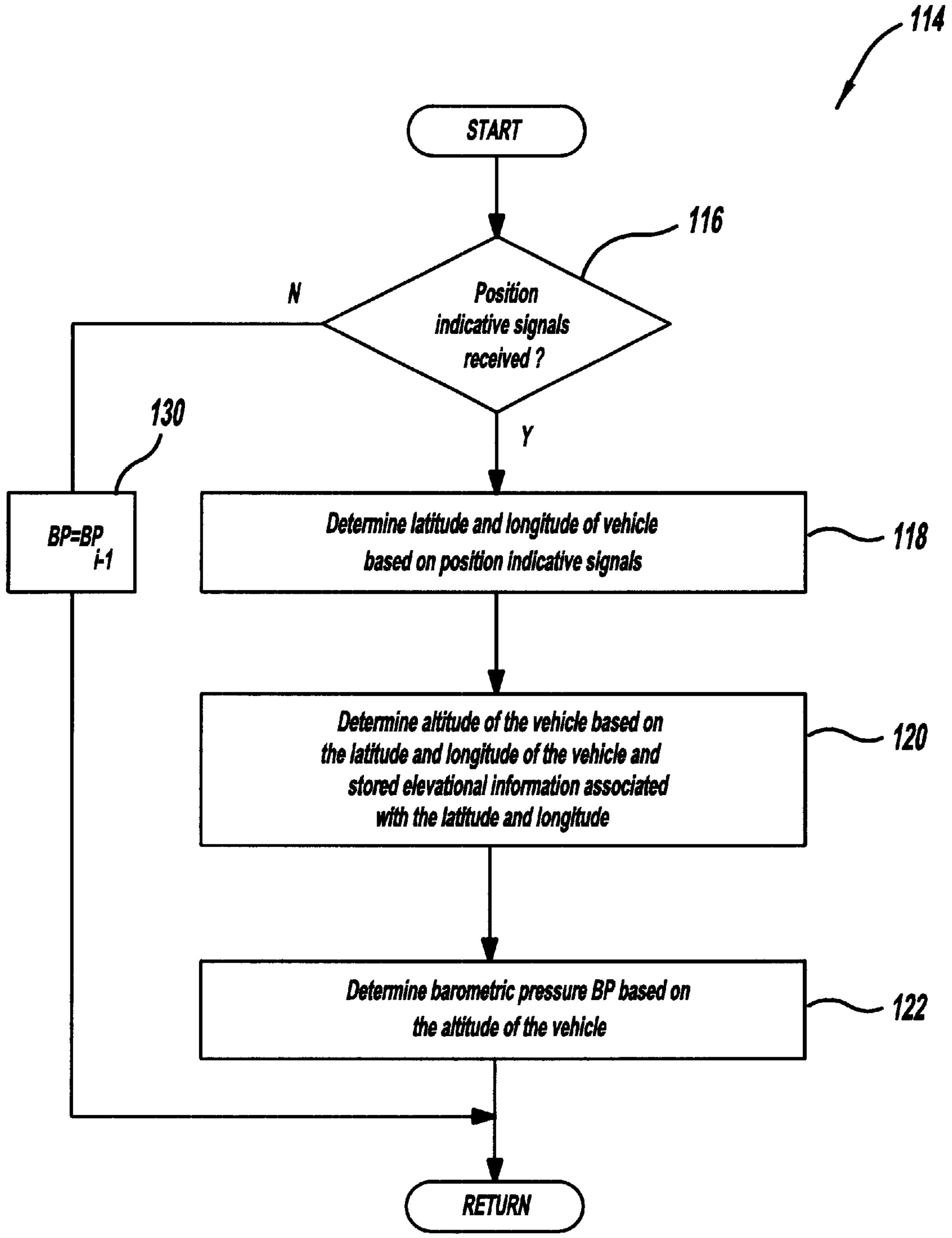

Referring to FIG. 3A, a method 97 for controlling an internal combustion engine 30 in accordance with the present invention is provided. The method may be advantageously utilized during engine crank or during closed-loop air-fuel control of the engine 30. The method includes a step 98 that determines the barometric pressure (BP) communicating with the vehicle 10. The step 98 may comprise three alternate methods illustrated in FIGS. 3B, 3C, 3D for determining the barometric pressure (BP) which will be discussed in greater detail below.

The method further includes a step 100 that determines the cylinder air charge of each of the cylinders of the engine 30 based on the barometric pressure (BP). Those skilled in the art will recognize that there are a plurality of conventional methods that may be utilized to calculate the cylinder air charge based on barometric pressure (BP). For example, the method disclosed in U.S. Pat. No. 6,115,664 entitled "Method Of Estimating Engine Charge", issued on Sep. 5, 2000, and assigned to the assignee of the present application, which is incorporated herein in its entirety, may be utilized to calculate the cylinder air charge. In particular, U.S. Pat. No. 6,115,664 discloses a method which determines the cylinder air charge based on the barometric pressure (BP), engine coolant temperature (ECT), air charge temperature (ACT), and engine speed (N).

Finally, the method includes a step 102 that calculates the desired fuel pulse width signal (FPW) based on the cylinder air charge, the desired air-fuel ratio, and the signal EGO. As discussed above, the signal (FPW) is utilized to control the fuel injector 56 to inject a desired amount of fuel into the combustion chamber 34. Further, the cylinder air charge used in step 102 is calculated based on the barometric pressure (BP) determined in step 100 by methods explained in greater detail below. The signal EGO may be utilized by the controller 66 for closed-loop air-fuel control of the engine 30 to improve emission performance of catalyst 58. Alternately, during open-loop air-fuel control of the engine 30, the controller 66 may calculate the fuel injection pulse width signal (FPW) based on the cylinder air charge and the desired air-fuel ratio.

Referring to FIG. 3B, a first method 105 for determining the barometric pressure (BP) in accordance with the present invention will be discussed. The method includes a step 106 that makes a determination as to whether position indicative signals have been received by the receiver 12 from the global positioning system 16. In particular, the step 106 may determine whether at least four signals have been received from four corresponding global positioning satellites. When the answer to step 106 equals Yes, the steps 108, 110 are performed.

The step 108 determines an altitude of the vehicle 10 based on the position indicative signals received from the global positioning system 16. In particular, the commercially available receiver 12 may determine the altitude of the vehicle 10 based on the received signals. Alternately, the receiver 12 may generate position values based on the received signals and transmit the values to the controller 66. Thereafter, the controller 66 may calculate the altitude based on the position values utilizing conventional triangulation algorithms known to those skilled in the art.

The step 110 following step 108 determines the barometric pressure (BP) based on the altitude of the vehicle. It is well known that as the altitude of the vehicle increases, the barometric pressure generally decreases according to a known relationship. Referring to FIG. 4, for example, a table 112 is shown including altitude values (with respect to Mean Sea Level) in conjuction with corresponding average barometric pressure values at various respective altitudes. The table 112 illustrated in FIG. 4 may be stored in the nonvolatile memory 92 of the controller 66. Thus, the controller 66 may access the table 112 to determine the barometric pressure (BP) based upon a determined altitude. It should be understood that when an altitude value (determined from the received signals) falls between the two altitude values in the table 112, the barometric pressure (BP) may be calculated by interpolating between two corresponding barometric pressures in the table 112. Alternately, when the altitude is known, the following equation may be utilized by the controller 66 to calculate the barometric pressure (BP):

$BP=BP_{SL}*(1-6.876E-6*ALT)^{5.257}$; where $BP_{SL}$= barometric pressure at sea level (14.7 PSI) ALT=altitude of vehicle in feet above sea level Referring again to step 106, when position indicative signals from four GPS satellites have not been received by the receiver 12, the value of step 106 equals No, and the step 112 is performed. The step 112 sets the current value for the barometric pressure (BP) equal to a previously determined barometric pressure ($BP_{i-1}$).

After either of steps 110, 112, the method advances to step 100 of the method 97.

Referring to FIG. 3C, a second method 114 for determining the barometric pressure (BP) in accordance with the present invention will be discussed. The method includes a step 116 that makes a determination as to whether position indicative signals have been received by the receiver 12 from the global positioning system 16. In particular, the step 116 may determine whether at least three position indicative signals have been received from three corresponding global positioning satellites. When the answer to step 116 equals Yes, the steps 118, 120, 122 are performed.

The step 118 determines the latitudinal and longitudinal position of the vehicle 10 based on the signals received from the global positioning system 16. In particular, the commercially available receiver 12 may determine the latitudinal and longitudinal position of the vehicle 10 based on the received signals. Alternately, the receiver 12 may generate position values indicative of the received signals and transmit the values to the controller 66. Thereafter, the controller 66 may calculate the latitudinal and longitudinal position based on the received position values utilizing conventional methods known to those skilled in the art.

The step 120 determines the altitude of the vehicle 10 based on the latitudinal and longitudinal position and stored elevational information associated with the latitudinal and longitudinal position. Referring to FIG. 5, the stored elevational information may comprise a map 124 which includes a Y-axis comprising latitudinal positions and an X-axis comprising longitudinal positions. Further, the map may be divided into grid areas 126 with an average altitude assigned to the specific grid area. Thus, for example, when the position of the vehicle 10 is determined to be within the grid area 128, the altitude of the vehicle 10 would be approximately 2000 feet MSL (mean sea level). The map 124 illustrated in FIG. 5 may be stored in the nonvolatile memory 92 of the controller 66 in the form of a table as known to those skilled in the art. Thus, the controller 66 may access the table to determine the altitude based on longitudinal and latitudinal position of the vehicle 10.

The step 122 following step 120 determines the barometric pressure (BP) based on the altitude of the vehicle 10. The step 122 may be implemented utilizing substantially the same methodology explained above with reference to step 110 (see FIG. 3B).

Referring again to step 116, when position indicative signals from three GPS satellites have not been received by the receiver 12, the value of step 116 equals No, and the step 130 is performed. The step 130 sets the current value for the barometric pressure (BP) equal to the previously determined barometric pressure ($BP_{i-1}$).

After either of steps 122, 130, the method 114 advances to step 100 of the method 97.

Figure 3D:
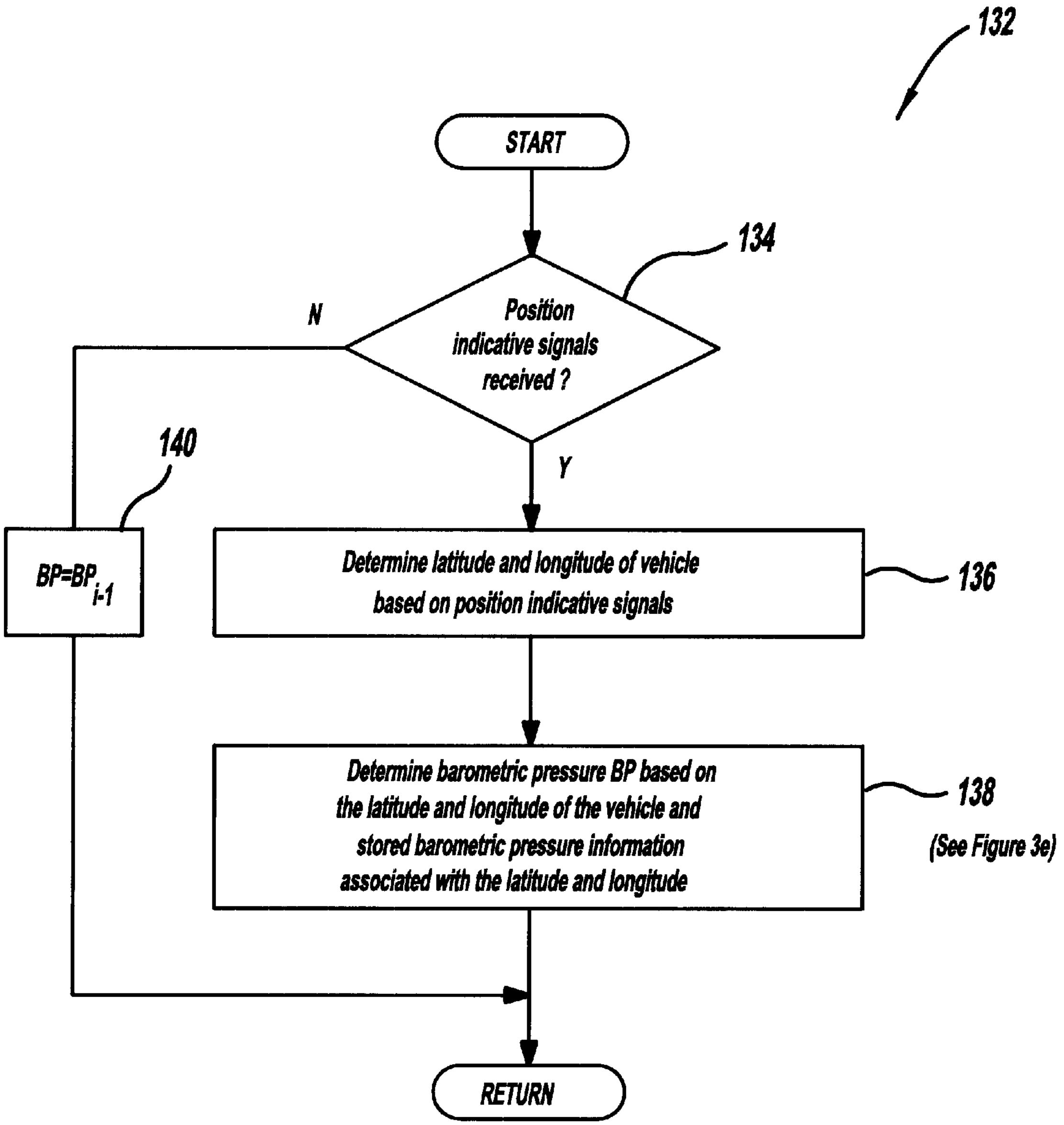

Referring to FIG. 3D, a third method 132 for determining the barometric pressure (BP) in accordance with the present invention will be discussed. The method 132 includes a step 134 that makes a determination as to whether position indicative signals from the global positioning system 16 have been received by the receiver 12. In particular, the step 134 may determine whether at least three position indicative signals have been received from three corresponding global positioning satellites. When the answer to step 134 equals Yes, the steps 136, 138 are performed.

The step 136 determines the latitudinal and longitudinal position of the vehicle 10 based on the signals received from the global positioning system 16. The step 136 may be implemented utilizing substantially the same methodology explained above with reference to step 118 of FIG. 3C.

The step 138 following the step 136, determines the barometric pressure (BP) based on the latitudinal and longitudinal position of the vehicle 10 and stored barometric pressure information associated with the latitudinal and longitudinal position. Referring to FIG. 6, the stored barometric pressure information may comprise a map 142 which includes a Y-axis comprising latitudinal positions and an X-axis comprising longitudinal positions. Further, the map 142 may be divided into grid areas 144 with an average barometric pressure assigned to the specific grid area. Thus, for example, when the position of the vehicle 10 is determined to be within the grid area 146, the barometric pressure (BP) communicating with the vehicle 10 would be estimated to be 13.6640625 PSI. The map 142 illustrated in FIG. 6 may be stored in the nonvolatile memory 92 of the controller 66 in the form of a table as known to those skilled in the art. Thus, the controller 66 may access the table to determine the barometric pressure (BP) based on the longitudinal and latitudinal position of the vehicle 10.

Referring again to step 134, when position indicative signals from three GPS satellites have not been received by the receiver 12, the value of step 134 equals No, and the step 140 is performed. The step 140 sets the current value for the barometric pressure (BP) equal to the previously determined barometric pressure ($BP_{i-1}$).

Figure 3E:
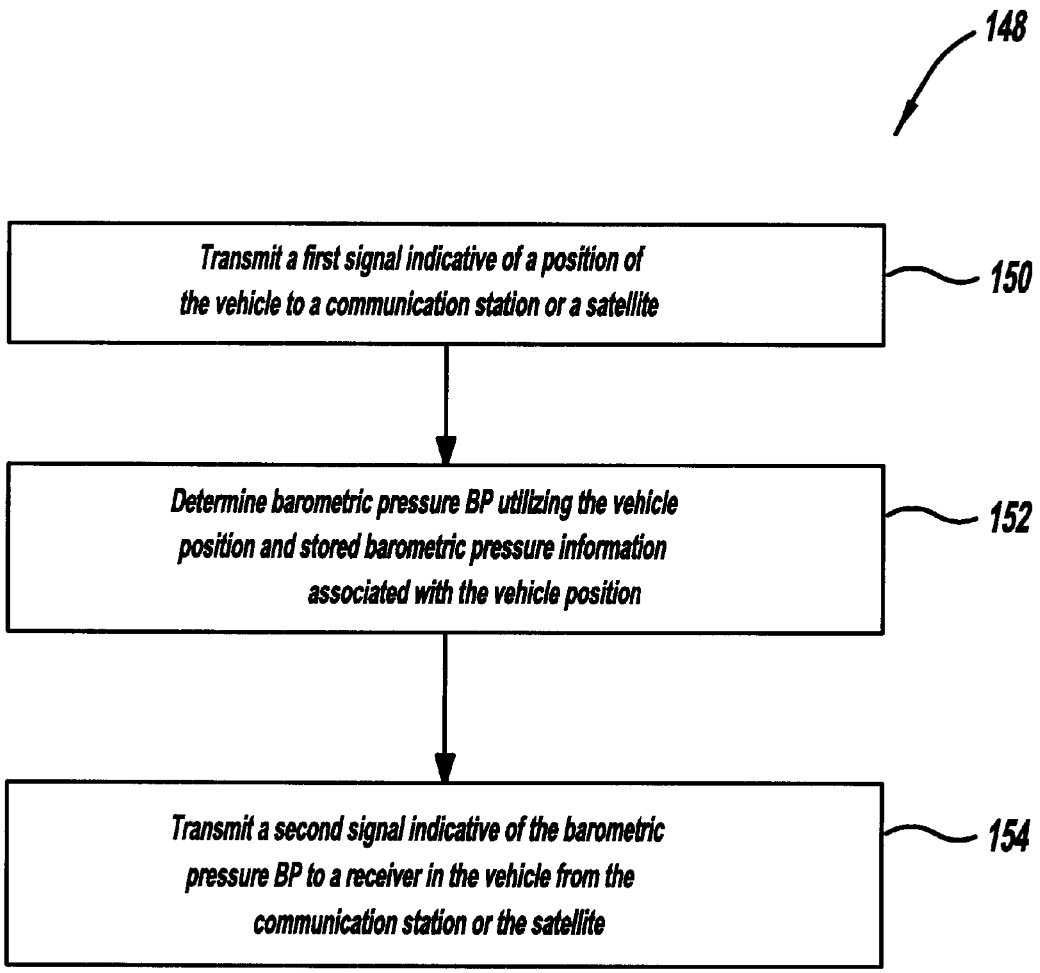

Referring to FIG. 3E, an alternate method 148 may be utilized to implement the step 138 of FIG. 3D. As illustrated, the method 148 may include the steps 150, 152, 154. Referring to FIGS. 1 and 3E, in step 150, an optional transceiver 14 in the vehicle 10 may transmit a signal indicative of the position of the vehicle 10 to a communication station 20 or to a communication satellite 18. As discussed above, the position of the vehicle 10 may be determined from signals received from a global positioning system 16. When the transceiver 14 transmits the signal indicative of the vehicle position to the satellite 18, the satellite 18 may relay the signal to the communication station 20. Further, a unique vehicle or transceiver identifier code may also be transmitted in the signal to allow the transceiver 158 or computer 156 of station 20 to distinguish between signals from vehicle 10 and signals from other vehicles.

Figure 7:
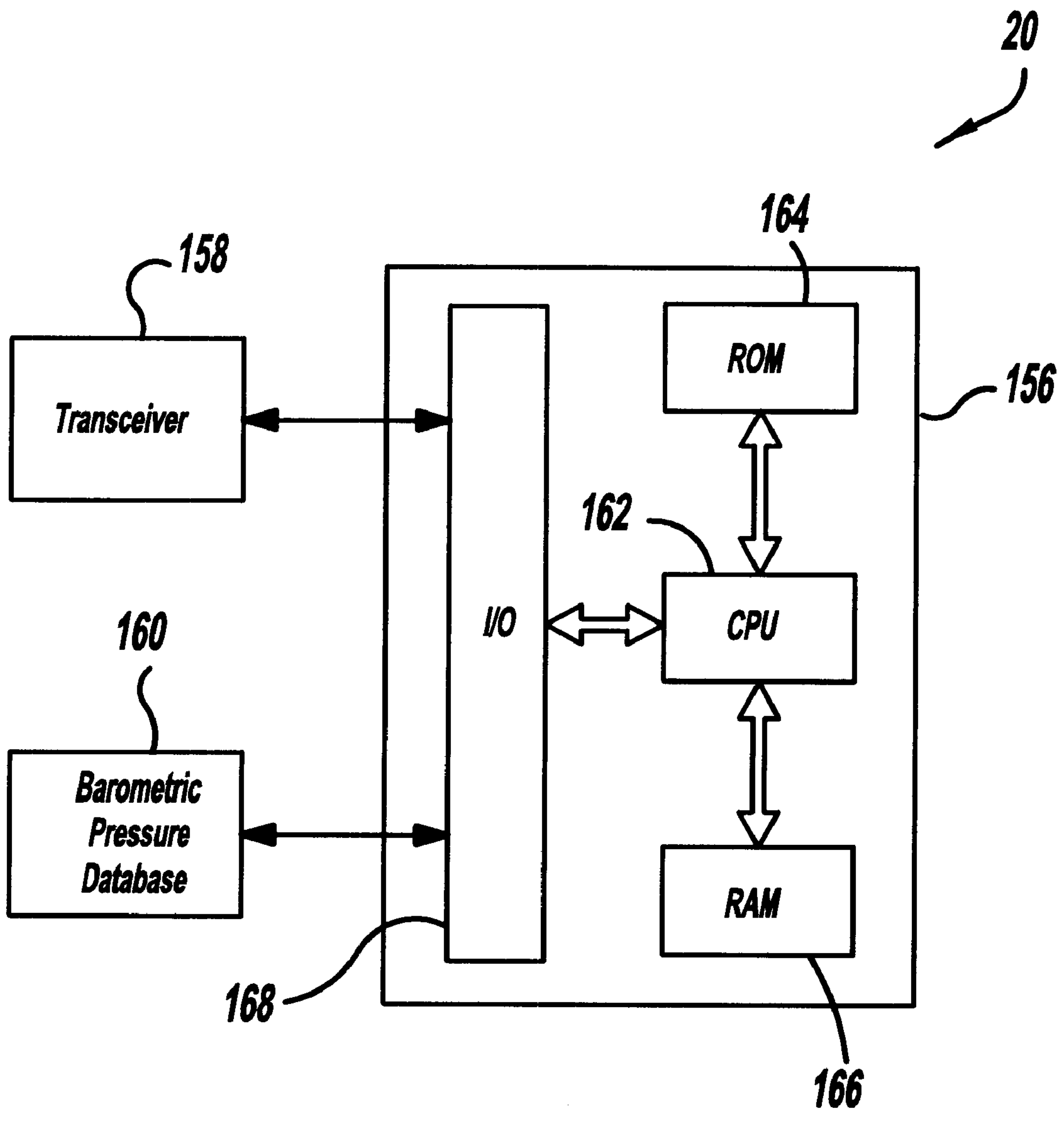
FIG. 7 is a schematic illustrating a communication station that can communicate with a vehicle in accordance with the present invention.

Referring to FIG. 7, the communication station 20 will be discussed before completing the explanation of the method 148. The communication station 20 may be provided to determine a barometric pressure (BP) associated with the vehicle position and communicate the barometric pressure (BP) to the controller 66 of the vehicle 10, as will be explained in greater detail below. The communication station 20 may include a conventional transceiver 158 for receiving the transmitted vehicle position, a computer 156, and a barometric pressure database 160. It should be understood that transceiver 158 could be replaced with a separate transmitter and receiver. The computer 156 may include a microprocessor 162, a ROM 164, a RAM 166, and I/O bus 168 as well known in the art. The barometric pressure database 160 may be operably accessed by the computer 156 and be implemented within the ROM of computer 156 or may comprise an external database as illustrated. Further, the database 160 may comprise a table of real-time barometric pressure readings or recently acquired and/or measured barometric pressure readings associated with specific geographic positions. As discussed above with reference to FIG. 6, a barometric pressure (BP) may be associated with a specific grid area or other predefined geographic area or position.

It should be further understood that a plurality of communication stations 20 may be disposed at various geographic locations to provide a transmission/reception coverage area encompassing an entire region, state, country, or continent.

Referring again to FIG. 3E, in step 152, the computer 156 may determine the barometric pressure (BP) by utilizing the position of the vehicle 10 to access a barometric pressure reading stored in the database 160 that is associated with the vehicle position. Next, in step 154, the computer 156 in conjuction with the transceiver 158 may transmit a second signal indicative of the determined barometric pressure (BP) directly to a transceiver 14 (or receiver) in the vehicle 10, or to a communication satellite 18 which then relays the signal to the transceiver 14. The unique vehicle or transceiver identifier code, discussed above, may also be transmitted in the second signal to allow the transceiver 14 or controller 66 to distinguish between signals directed to vehicle 10 and signals directed to other vehicles. As one skilled in the art can recognize, utilizing real-time barometric pressure readings (or recently measured barometric pressure readings) associated with specific vehicle positions could allow enhanced engine control improving fuel economy and reducing emissions.

From the foregoing discussion of methods 105, 114, 132, the latitudinal position and longitudinal position of the vehicle 10, or the altitude of the vehicle 10 may be determined from a plurality of signals received from the global positioning system 16. Alternately, the control system 32 could determine the latitudinal position and longitudinal position of the vehicle 10, or the altitude of the vehicle 10, from one signal indicative of the foregoing positional information.

The control system 32 and method 97 for controlling an internal combustion engine 30 in accordance with the present invention provide a substantial advantage over conventional systems and methods. In particular, since many vehicle manufacturers are installing GPS receivers 12 in current production vehicles, the receiver 12 may be readily utilized to determine barometric pressure as discussed above, without having to add an additional pressure sensor to the vehicle. Further, the inventive method and system provide for more accurate barometric pressure readings as compared with known methods for estimating the barometric pressure (BP) when no pressure sensor is present in the vehicle. Thus, an engine controller utilizing the more accurate barometric pressure (BP) from the inventive system can determine a more accurate cylinder air charge and fuel injection amount—based on the barometric pressure (BP)—to improve fuel economy and to reduce emissions. Further, the inventive control system 32 and method solves the potential problems of "no start" or "long start" conditions, during engine crank at high altitudes, due to a rich air-fuel mixture being injected in the engine cylinders because of inaccurate barometric pressure estimates.

We claim:

1. A method for controlling an internal combustion engine of a vehicle, comprising:

providing a fuel injection amount during engine crank based on a barometric pressure, and said barometric pressure determined from at least one signal received from at least one transmitter external from said vehicle.

2. The method of claim 1 wherein said at least one signal is indicative of longitudinal and latitudinal position of said vehicle, or an altitude of said vehicle.

3. The method of claim 1 wherein said at least one transmitter is a global positioning system.

4. The method of claim 3 wherein said step of adjusting said fuel injection amount includes:

determining an altitude of said vehicle based on said at least one signal received from said global positioning system; and, determining said barometric pressure based on said altitude.

5. The method of claim 3 wherein said step of adjusting said fuel injection amount includes:

determining a position of said vehicle based on said at least one signal received from said global positioning system;

determining an altitude of said vehicle based on said position and stored elevational information corresponding to said position; and, determining said barometric pressure based on said altitude.

6. The method of claim 3 wherein said step of adjusting said fuel injection amount includes:

determining a position of said vehicle based on said at least one signal received from said global positioning system; and, determining said barometric pressure based on said position and stored barometric pressure information corresponding to said position.

7. The method of claim 1 wherein said step of adjusting said fuel injection amount includes:

determining a cylinder air charge amount responsive to said barometric pressure; and, determining a desired fuel injection amount based on said cylinder air charge amount.

8. The method of claim 1 wherein said barometric pressure is ambient air pressure communicating with said vehicle.

9. The method of claim 1 wherein said at least one signal is indicative of barometric pressure and said external transmitter is a communication station transmitter or a satellite transmitter.

10. A method for controlling an internal combustion engine of a vehicle, comprising:

determining a barometric pressure communicating with said vehicle based on at least one signal received from a global positioning system; and, providing a fuel injection amount in said engine during engine crank responsive to said barometric pressure.

11. The method of claim 10 wherein said at least one signal is indicative of an altitude of said vehicle.

12. The method of claim 10 wherein said at least one signal is indicative of a longitudinal position and a latitudinal position of said vehicle.

13. A method for controlling an internal combustion engine of a vehicle, comprising:

determining a barometric pressure communicating with said vehicle based on at least one signal indicative of said barometric pressure received from a communication station or a satellite; and, providing a fuel injection amount during engine crank responsive to said barometric pressure.

14. The method of claim 13 wherein said step of determining said barometric pressure includes:

transmitting a first signal indicative of a position of said vehicle to a communication station or a satellite;

determining said barometric pressure utilizing said position and stored barometric pressure information corresponding to said position; and, transmitting a second signal indicative of said barometric pressure to a receiver in said vehicle from said communication station or said satellite.

15. A method for controlling an internal combustion engine, comprising:

providing a fuel injection amount in a port fuel injection engine during engine crank based on a barometric pressure, and said barometric pressure determined from at least one signal received from at least one transmitter external from said vehicle.

16. A control system for an internal combustion engine, comprising:

a receiver receiving at least one signal from at least one transmitter external from said vehicle, said signal being indicative of barometric pressure; and, a controller operably connected to said receiver, said controller providing a fuel injection amount in said engine during engine crank responsive to said barometric pressure.

17. The control system of claim 16 wherein said at least one transmitter is a global positioning system.

18. The control system of claim 16 wherein said at least one transmitter is a communication station transmitter or a satellite transmitter.

19. The control system of claim 16 wherein said at least one signal is indicative of an altitude of said vehicle.

20. The control system of claim 16 wherein said at least one signal is indicative of a longitudinal position and a latitudinal position of said vehicle.

21. The control system of claim 16 wherein said at least one signal is a barometric pressure signal.

22. An article of manufacture comprising:

a computer storage medium having a computer program encoded therein for controlling an internal combustion engine, said computer storage medium comprising:

code for determining a barometric pressure based on at least one signal received from at least one transmitter external from said vehicle; and, code for providing a fuel injection amount in said engine during engine crank responsive to said barometric pressure.

* * * * *